United States Patent

[11] 3,622,287

[72] Inventors: Mikishi Kurimoto, Nagoya; Hiroyasu Takegawa, Kriya; Sadamu Kato, Aichi-ken, all of Japan
[21] Appl. No.: 47,665
[22] Filed: June 19, 1970
[45] Patented: Nov. 23, 1971
[73] Assignee: Toyoda Koki Kabrishiki Kaisha, Aichi-ken, Japan
[32] Priority: June 26, 1969
[33] Japan
[31] 44/50789

[54] NUMERICALLY CONTROLLED GRINDING MACHINE WITH A SIZING DEVICE
6 Claims, 8 Drawing Figs.

[52] U.S. Cl. .................................................. 51/165 R, 51/165 TP, 51/165.8
[51] Int. Cl. ...................................................... B24b 49/04
[50] Field of Search ........................................ 51/165 R, 165 TP, 165.71, 165.74, 165.75, 165.76, 165.8, 165.87, 165.88, 165.9, 165.91, 165.92

[56] References Cited
UNITED STATES PATENTS

| | | | |
|---|---|---|---|
| 2,509,368 | 5/1950 | Price ............................. | 51/165.9 X |
| 3,056,240 | 10/1962 | Morgan et al. ................ | 51/165 TP |
| 3,192,675 | 7/1965 | Fries et al. .................... | 51/165 R |
| 3,568,372 | 3/1971 | Asano et al. .................. | 51/165 R |

Primary Examiner—Lester M. Swingle
Attorney—Berman, Davidson and Berman

ABSTRACT: A grinding machine is provided with a sizing device for providing a sizing signal which controls a hydraulic actuator to feed a wheel slide. A sizing point of the sizing signal is shifted to be preset in accordance with numerical information of a desired finish dimension of a workpiece before grinding. In accordance with the numerical information, simultaneously it is compensated in an original position of the wheel slide relative to the workpiece by a servomotor so that the vacant space between a grinding wheel and the workpiece may be maintained constant when the grinding wheel has been advanced by its hydraulic actuator to the rapid feed end of its feed stroke.

Fig. 1

INVENTORS,
MIKISHI KURIMOTO,
HIROYASU TAKEGAWA,
SADAMU KATO,

BY
Berman, Davidson & Berman,
ATTORNEYS.

NUMERICALLY CONTROLLED GRINDING MACHINE WITH A SIZING DEVICE

BACKGROUND OF THE INVENTION

The present invention relates to a grinding machine and more particularly to an apparatus for controlling the transverse movement of a grinding wheel in accordance with numerical information of a finish dimension of a workpiece.

Grinding machines employing numerical control systems are becoming more prevalent in accordance with the spread of numerical control systems generally with regard to machine tools. Generally speaking, however, it has been difficult to adopt numerical control systems in the art of precision grinding operations in which micron order of accuracy is required, in contrast to the lesser degree of required accuracy with cutting operations. In fact, it is not easy to accurately position the peripheral surface of a grinding wheel relative to that of a workpiece for reasons such as thermal deformations of the grinding machine and the workpiece, backlash of the feed screw in e prfeeding mechanism, grinding wheel wear, and the like. Therefore, high precision in a grinding operation cannot be expected wherein the feed movement of the wheel slide is controlled only by a numerical control device for the feed screw of the wheel slide.

For the purpose of overcoming the aforementioned disadvantages, it has been proposed that the grinding machine use a numerical control device together with a sizing device which measures directly a diameter of the workpiece to be worked on to provide a sizing signal, wherein the sizing point is preset by changing the space between a pair of measuring feelers in accordance with numerical information of a finish diameter. However, the sizing device can but control the feed movement during a grinding operation, so that other information is required to control feed speed change from a rapid feed rate to a slow feed rate for grinding and the feed amount in the transverse movement of the wheel slide.

Accordingly, a plurality of sets of information, such as mentioned above, must ogrammed and encoded on a tape or record for the purpose of achieving the feed control of the wheel slide. As a result, the programming for a machining operation has been considerably bulky and complicated, whereas the conventional system has been satisfactory in many other respects.

It is, therefore, desirable to control precisely the transverse movement of the wheel slide over a wide range only by numerical information relative to the desired finish diameter of the workpiece through the agency of a sizing device.

SUMMARY OF THE INVENTION

According to the present invention, there is provided a grinding machine which comprises feed means for moving a feed screw threadedly engaging with a wheel slide to move the same, compensating means having a first servomotor for compensating an original position of the wheel slide relative to a workpiece in accordance with a command, sizing means for providing a sizing signal to control the feed means in response to the diameter of the workpiece during a grinding operation, the sizing signal being generated at a predetermined sizing point, which is shifted to be preset by changing a space between a pair of measuring feelers of the sizing means through the agency of a second servomotor of the sizing means in accordance with the command before the grinding operation, and control means for simultaneously providing the command to the first and second servomotors to cause them to operate in accordance with numerical information of a desired finish dimension of the workpiece.

The first and the second servomotors are simultaneously operated in accordance with the same command for the grinding operation. The compensating operation of the wheel slide, whose amount is equal to equal to one-half of the differential in a desired finish diameter between the workpiece and the workpiece previously worked, is simultaneously performed together with the shifting operation of the sizing point, through the feed means.

After the aforementioned operation, the wheel slide is advanced by the feed means toward the workpiece at a rapid feed rate, which is shifted to a reduced rate for grinding just before the grinding wheel comes into contact with the workpiece. The feed operation thereafter is controlled by the sizing signal from the sizing means.

An object of the invention is to provide a grinding machine with a simplified and inexpensive control system in which it is easy to program a feed operation of the wheel slide. Another object of the invention is to provide a grinding machine with compensating means for compensating an original position of the wheel slide relative to a workpiece in accordance with numerical information of a desired finish dimension of the workpiece.

Another object of the invention is to provide a grinding machine with sizing means for providing a sizing signal to control the movement of the wheel slide, the sizing signal being generated at a predetermined sizing point, which is shifted by a servomotor in accordance with numerical information of a desired finish dimension of a workpiece.

Another object of the invention is to provide a grinding machine with control means which provides a command corresponding with numerical information of a desired finish dimension simultaneously to compensating means for the wheel slide and to sizing means.

DESCRIPTION OF THE DRAWINGS

The foregoing and other objects of the present invention will become fully apparent from the following description of a preferred embodiment of the present invention with reference to the accompanying drawings, in which.

DESCRIPTION OF A PREFERRED EMBODIMENT

Figure 1:
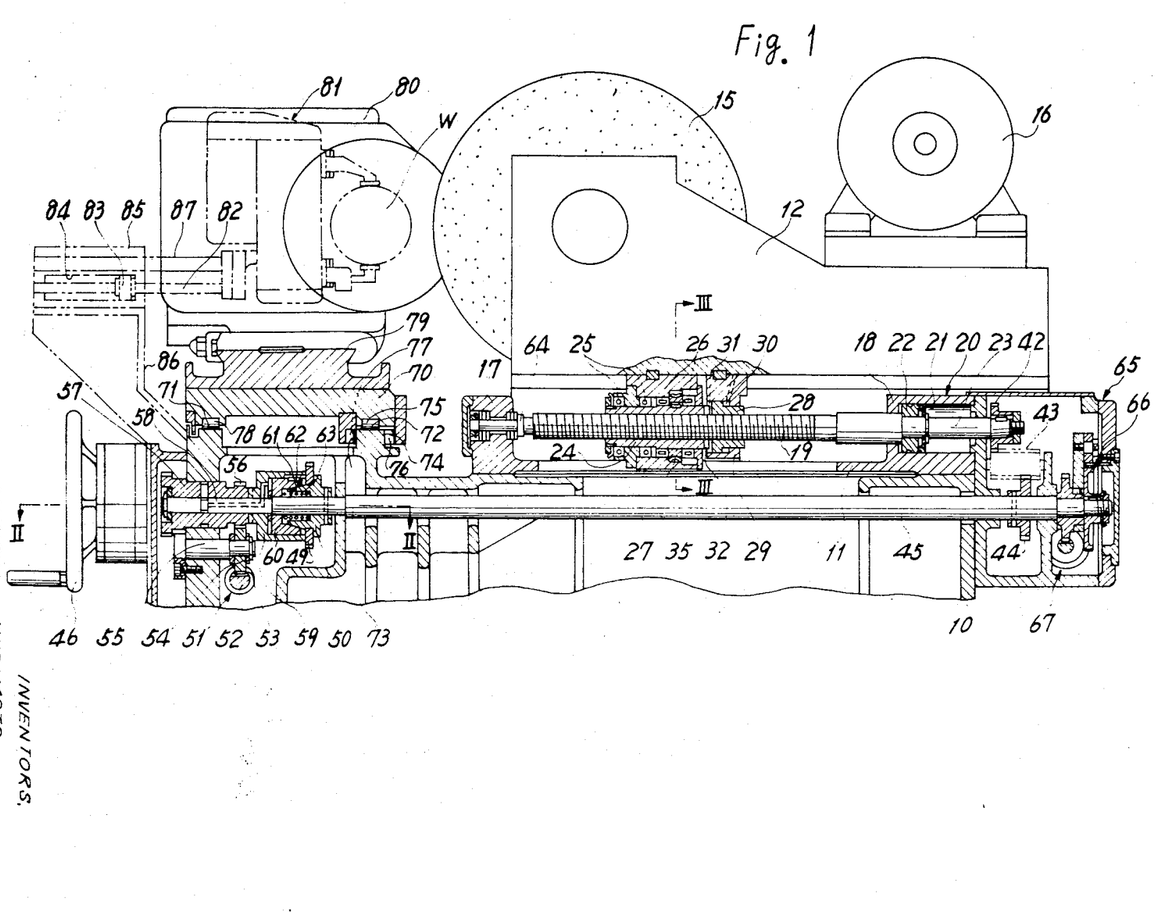
FIG. 1 is a transverse sectional view showing a feed mechanism for a wheel slide.
Figure 2:
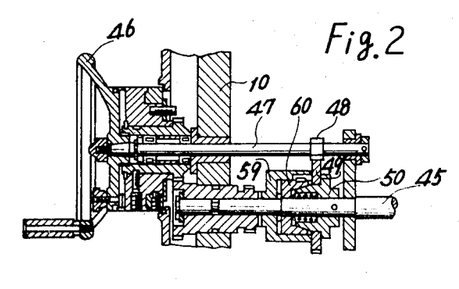
FIG. 2 is a sectional view taken along the line 2—2 of FIG. 1.
Figure 3:
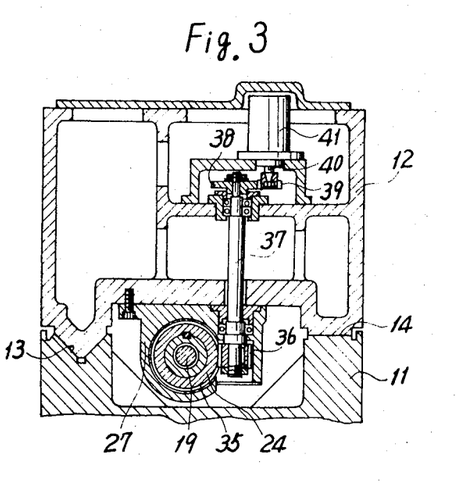
FIG. 3 is a sectional view taken along the line 3—3 of FIG. 1.

Referring to FIGS. 1 to 3 showing a feed mechanism of a grinding machine, a bed 10 fixedly mounts thereon a wheel base 11 which slidably receives a wheel slide 12 thereon for movement in one direction along guideways 13 and 14, shown in FIG. 3, formed on the wheel base 11. A grinding wheel 15 is rotatably carried in the wheel slide 12 and is actuated by an electric motor 16 secured on the wheel slide 12. The wheel base 11 has thereon two opposite hub portions 17 and 18 which slidably and rotatively receive a feed screw 19 therein. The hub portion 18 includes a hydraulic actuator 20, for a rapid feed movement of the wheel slide 12, consisting of a cylindrical bore 21, a piston 22 slidably received in the bore 21 and a piston rod 23 defined by one end of the feed screw 19 and connected to the piston 22. The threaded portion of the feed screw engages a nut sleeve 24 rotatably mounted by bearings 25 and 26 in a bracket 27 which is secured on the lower surface of the wheel slide 12.

The threaded portion of the feed screw 19 also engages a female screw member 28 adjacent to the nut sleeve 24 and slidably received in a bracket 29 secured on the lower surface of the wheel slide 12. The female screw member 28 is normally urged toward the nut sleeve 24 by the force of pressure fluid supplied in a chamber 30 defined by the female member 28 and the bracket 29, with engagement of a radial groove 31 at one end of the female member 28 with a projection 32 at one end of the nut sleeve 24, whereby to eliminate backlash between the feed screw 19 and the nut sleeve 24.

A worm wheel 35 keyed to the nut sleeve 24 engages with a worm 36 keyed to one end of a shaft 37 rotatably journaled in the wheel slide 12, as shown in FIG. 3.

A gear 38 secured to the other end of the shaft 37 meshingly engages with a gear 39 secured to the output shaft 40 of a pulse motor 41 fixedly mounted on the wheel slide 12. Thus, the worm wheel 35, and in turn, the nut sleeve 24 are rotated by the pulse motor 41 through the gear train. When the pulse motor 41 is inoperative, the nut sleeve 24 is restrained against rotation through the worm interengagement.

On the rearward portion of the feed shaft 19 is formed a gear 42 which is in slidable meshing engagement with a relatively long gear 43. The gear 43 is meshingly engaged with a gear 44 secured on the right end portion of a driving shaft 45 which is rotatably mounted in the bed 10.

As shown in FIG. 2, a manually operable hand wheel 46 is secured on the left end of a shaft 47 rotatably supported in the bed 10, and a gear 48 formed on the shaft 47 is meshingly engaged with a gear 49 concentrically secured on the driving shaft 45 through a clutch member 50. On the bed 10 is mounted a hydraulic actuator 51, for slow feed movement of the wheel slide 12, including a piston rod 52 on which a rack 53 is formed. The rack 53 is engaged with a gear 54 rotatably mounted on a shaft 55 which is fixedly secured to the bed 10. The gear 54 is, in turn, engaged with a gear 56 formed on a sleeve 57 which is rotatably supported in a bore formed in the bed. The sleeve 57 rotatably supports therein a reduced portion 58 of the driving shaft 45. A clutch cylinder 59 is connected to the right end of the sleeve 57. A clutch piston 60 is slidably keyed internally to the clutch cylinder 59 and is movably mounted on the reduced portion 58 of the driving shaft 45. The piston 60 is rightwardly movable by operation of pressure fluid so that an inner conical surface 61 formed on the piston 60 may be complementally and frictionally engaged with an outer conical surface 62 of the clutch member 50. A spring 63 is seated between the clutch elements 60 and 50 to release engagement therebetween.

In operation, the feed screw 19 may be rotated through the driving shaft 45 and the gears 44, 43 and 42 either manually by the hand wheel 46 with the above-described clutch means disengaged, or automatically by the slow feed hydraulic actuator 51 with said clutch means engaged. Moreover, the feed screw 19 may be rapidly moved in its axial direction by the rapid hydraulic actuator 20. Rotatably mounted in the hub portion 17 of the wheel base 11 is a stop member 64 which is adapted to be engaged with the left end of the feed screw 19 upon rapid movement of the wheel slide 12 to the left by the actuator 20.

At the right end of the drive shaft 45 is provided an automatic grinding wheel compensating apparatus 65 which comprises a ratchet mechanism 66 and a hydraulic actuator 67. The operation of hydraulic actuator 67 causes the feed screw 19 to be rotated through the ratchet mechanism 66 and the gearing so that the wheel slide 12 is advanced to the left by a compensating amount equal to a dressing amount by which the periphery of the grinding wheel 15 is dressed by a dressing apparatus (not shown).

A worktable 70 is slidably mounted for movement in a direction perpendicular to the direction of the wheel slide 12 on guideways 71, 72, 73 and 74 through way bearings 75, 76, 77 and 78. The worktable 70 is adapted to be driven by a suitable actuator (not shown) to position the work with respect to the grinding wheel in various work operation positions. On the worktable 70 is pivotally mounted a swivel table 79 on which a headstock 80 and a tailstock (not shown) are mounted in a well-known manner, and a workpiece W is supported therebetween. A sizing device 81 for sizing or measuring the diameter of the workpiece W is connected to one end of a piston rod 82, the other end of which is connected to a piston 83, slidably mounted in a hydraulic actuator 84. The hydraulic actuator 84 is fixed on a base member 85 secured to the bed 10 through a pedestal 86. The base member 85 has therein a slidable guide rod 87, one end of which is connected to the sizing device 81 for guidance thereof. The operation of the hydraulic actuator 84 moves the sizing device 81 toward and away from the sizing position where the feelers 115, 116 embrace the workpiece W at diametrically opposite portions.

Figure 4:
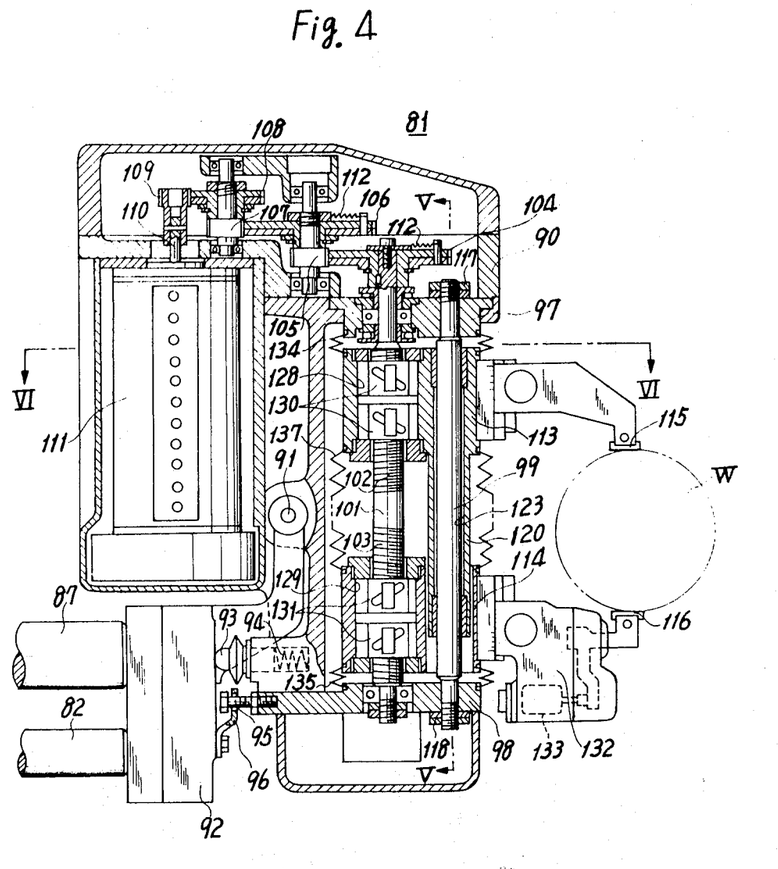
FIG. 4 is a longitudinal sectional view showing a sizing device on a large scale.

As best shown in FIG. 4, the sizing device 81 comprises a sizing head 90 pivotally mounted by a pin 91 on a bracket 92 connected to the guide rod 87 and the piston rod 82 of the hydraulic actuator 84. At the lower end of the sizing head 90 is mounted a plunger 93 which is urged by a spring 94 toward the front surface of bracket 92 so as to maintain the sizing head balance around the pivot pin 91. A projection 95 adjustably secured to the sizing head 90 and having an enlarged portion at its left end regulates the range of pivotal movement of the sizing head 90, cooperating with a stop 96 fixed on the bracket 92.

Figure 5:
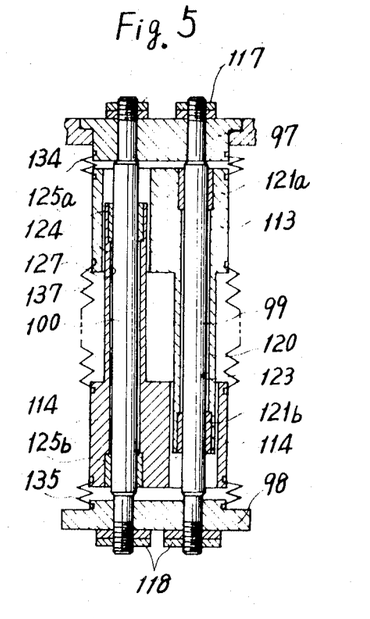
FIG. 5 is a sectional view taken along the line 5—5 of FIG. 4.
Figure 6:
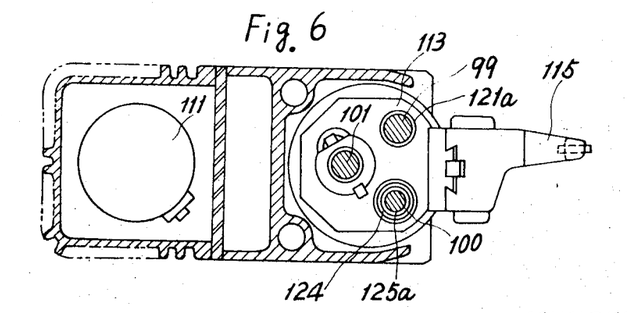
FIG. 6 is a sectional view taken along the line 6—6 of FIG. 4.

On the upper and lower ends of the sizing head 90 are respectively secured jaws 97 and 98 which mount two guide bars 99 and 100 therebetween, and opposite ends of the guide bars 99 and 100 are secured by nuts 117 and 118 to the jaws 97 and 98. On an axis equidistant from the axes of guide bars 99 and 100 is rotatably mounted a feed rod 101 on which a right-hand threaded portion 102 and a left-hand threaded portion 103 are formed. On the upper portion of the feed rod 101 is secured a gear 104 which is drivingly coupled with the output shaft 110 of a pulse motor 111 mounted on the sizing head 90 through gears 105, 106, 107, 108 and 109. The compound gears 104, 106 and 108 which each comprise two concentric relatively rotatable gears urged by a spring 112 therebetween are meshingly engaged with single gears 105, 107 and 109, respectively, so as to eliminate backlash of the gears. Movable support members 113 and 114 carrying measuring feelers 115 and 116 thereon respectively are slidably mounted on guide bars 99 and 100. The support members 113 and 114 are formed with openings for the guide bars 99 and 100 and the feed rod 101 extending therethrough.

A downwardly directed cylindrical extension 120 is formed integrally with the support member 113, and a pair of guide bushings 121a and 121b are fitted in the upper end and the lower end respectively of the bore 123 of the support member 113 and the cylindrical extension 120. An upwardly directed cylindrical extension 124 is formed integrally with the support member 114, and a pair of guide bushings 125a and 125b are fitted in the upper and the lower ends respectively of the bore 127 of the support member 114 and the cylindrical extension 124. The openings 128 and 129 formed in the support members 113 and 114 respectively for the feed rod 101 extending therethrough have secured therein female threaded members 130 and 131 which threadedly engage the right-hand threaded member 102 and the left-hand threaded member 103 of the feed rod respectively. Each of the internally threaded members 130 and 131 consists of a set of two nuts of the circulating ball-type. The two nuts are rendered preloaded through adjustment of the thickness of a spacing collar interposed therebetween to eliminate backlash of the threaded portions.

The feeler 115 is adjustably mounted by a dovetail engagement on the upper support member 113, while a block 132 pivotally mounting the feeler 116 and including a built-in displacement detector 133 such as a differential transformer, to detect the displacement of the pivotal feeler 116, is adjustably mounted by dovetail engagement on the lower support member 114. Upon predetermined pivotal movement of the feeler 116, the detector initiates a sizing signal at a sizing point, which is set by changing the space between the pair of measuring feelers, whereby to change the feed rate of the grinding wheel.

A bellows 134 made of rubber or like material is clamped at its lower end to the periphery of the upper end of the support member 113 and at its upper end to the peripheral edge of the jaw 97. Similarly, a bellows 135 is clamped at its opposite ends to the periphery of the lower end of the support member 114 and the peripheral edge of the jaw 98. A bellows 137 is clamped at its opposite ends to the lower end of the support member 113 and the upper end of the support member 114. The provision of bellows 134, 135 and 137 is effective to prevent grinding wheel granules and coolant from adhering to the guide rods and the feed rod by covering and enclosing same.

As described above, the sizing device 81 is effective to rotate the feed rod 101 through the associated gearing upon application of predetermined pulse signals through the pulse motor 111, thereby to accurately move the support member 113 and the support member 114 having thereon the feelers 115 and 116, respectively, by a predetermined amount in directions opposite to each other. Since the displacement detector 133 is moved together with the feeler 116, the sizing point is shifted in accordance with the change of the interval between the feelers 115 and 116. Control of the pulse signals to the pulse motor 111 in accordance with change in diameter of the workpiece to be ground enables automatic sizing of a plurality of workpieces with different diameters, or one workpiece with a plurality of stepped portions, by the same sizing device 81. This automatic sizing permits a sizing signal to be generated at the sizing point, providing a predetermined voltage level of the displacement detector 133, to control the feed rate of the wheel slide 12.

A numerical control circuit for controlling the aforementioned devices will be described hereinafter with reference to FIG. 7. Numeral 140 refers to a tape reader, 141 to a decoder, 142 to a preset counter, 143 to a pulse generator, 144 to a gate, 145 to a control circuit, 146 and 147 to drive circuits for the pulse motors 111 and 41, 148 to a manual operations circuit, 149 through 152 to AND gates, the aforementioned devices being well known and commercially available, and 153 to a hydraulic control circuit for feed movement of the wheel slide 12. The hydraulic control circuit 153 is adapted to control energization and deenergization of solenoids 154, 155 and 156 of solenoid valves 157, 158 and 159 which are connected to the hydraulic actuators 20 and 51 so as to change the feed rate of the wheel slide 12, as described hereinafter.

Figure 8:
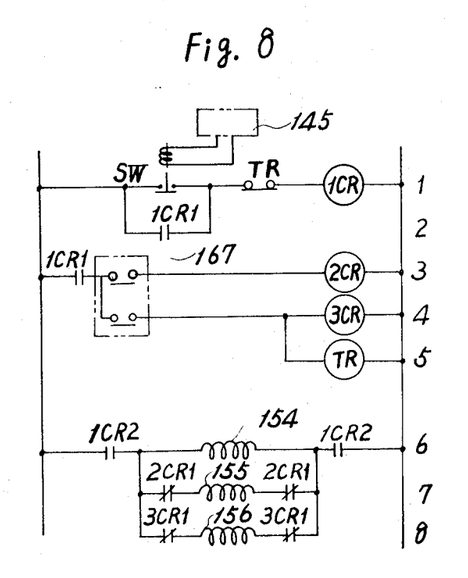
FIG. 8 is a wiring diagram of the hydraulic control circuit employed in the system shown in FIG. 7.

In FIG. 8, a switch SW is closed by a command transmitted from the manual operation circuit 148 through the control circuit 145 to energize relay 1CR of line 1. At the same time, normally open contacts 1CR1 and 1CR2 are closed to energize solenoid 154, energizing solenoid 155 and 156 through normally closed contacts 2CR1 and 3CR1.

Upon energization of solenoids 154, 155 and 156, the solenoid valve 157 is reversed and the valves 158 and 159 are opened so that fluid under pressure is supplied from a fluid supply source (not shown) into each one of the chambers of the actuators 20 and 51, thereby to advance the wheel slide 12 toward the workpiece W at a rapid feed rate by the movement of pistons 22 and 52. Thereafter, upon engagement of the left end of feed screw 19 with the stop member 64, the wheel slide member 12 is advanced at a reduced speed by the movement of piston 52 for rough grinding. The reduced speed is determined by the orifice size of a flow control valve 160 interposed between the actuator 51 and the solenoid valve 158.

When the rough grinding operation has been performed, relay 2CR of line 3 is energized by a first pulse signal from Schmidt circuit 167, as described hereinafter, to open normally closed contacts 2CR1 whereby the solenoid 155 is deenergized to shut a bypass passage including the valve 158 so that the wheel slide 12 is advanced at a further reduced speed for fine grinding, which is determined by the setting of a flow control valve 161. When a fine grinding operation has been performed, relay 3CR and timer TR are energized by a second pulse signal from the Schmidt circuit 167 to open normally closed contacts 3CR, deenergizing solenoid 156. Upon the deenergization of solenoid 156, the solenoid valve 159 is closed to block the exhaust flow from the actuator 51. Thus, the grinding wheel 15 remains stopped at the grinding position of the workpiece W to effect a spark-out operation, of which the time duration is preset by the timer relay TR.

The timer relay is deenergized after a predetermined time to open timer switch TR, deenergizing relay 1CR, whereby normally open contacts 1CR1 and 1CR2 are opened to deenergize solenoid 154. Upon deenergization of solenoid 154 after the spark-out operation, the solenoid valve 157 is changed over to the position shown in FIG. 7, to return the wheel slide 12 and the pistons 22 and 52 to their original positions shown in FIG. 7, at a rapid speed. Upon retraction of wheel slide 12 to its original position, the hydraulic control circuit 153 operates the control circuit 145 to perform the succeeding grinding operation.

The displacement detector 133 in the sizing device 81 is connected to the hydraulic control circuit 153 through an amplifier 165, a rectifier circuit 166 and a Schmidt trigger circuit 167 which compares an output signal of the detector 133 with preset voltage thereof. A pulse signal is generated at the sizing point, that is, when the output signal voltage level of the detector 133 is over the preset voltage level in the Schmidt circuit 167. This pulse signal is transmitted to the hydraulic control circuit 153 to actuate the solenoid valves 157, 158 and 159, thereby to control the feed rate of the wheel slide 12 for fine grinding operation, spark-out operation and the rapid return of the wheel slide 12.

The drive circuit 147 is connected so as to control the pulse motor 41 which rotates the nut sleeve 24 with respect to the feed screw 19 through the associated gearing, whereby the wheel slide 12 is relatively moved in response to pulses applied by the pulse generator 143 to the drive circuit 147 through the gate 144. The drive circuit 146 is connected to the pulse motor 111 of the sizing device 81 to rotate the threaded rod 101 through a predetermined angle whereby the feeler 115 and the feeler 116, including the detector 133, are moved in accordance with the numerical information relative to a desired finish dimension of the workpiece W. Thus, the sizing point of the sizing signal is shifted to be preset by changing the space between the pair of feelers 115 and 116 in accordance with the desired finish diameter.

Opening and closing of the AND gates 149 through 152 are controlled by a command from the control circuit 145. When opened by the control circuit 145 through a line 170, the AND gates 149 and 151 permit the output pulses from the pulse generator 143 to be applied to the drive circuits 146 and 147 to simultaneously rotate the pulse motors 111 and 141 a predetermined angular amount in one direction. On the other hand, when opened by the control circuit 145 through a line 171, the AND gates 150 and 152 permit the output pulses from the pulse generator 143 to be applied to the drive circuits 146 and 147 to simultaneously rotate the pulse motors 111 and 41 a predetermined angular amount in the opposite direction.

Thus, the wheel slide 11 is automatically moved and compensated in accordance with the displacement amount of the feelers 115 and 116 of the sizing device 81, that is, the wheel slide 12 is transversely moved by cooperation of the nut sleeve 24 and the feed screw 19 to compensate the position of the grinding wheel 15 relative to the workpiece W by an amount corresponding to change in diameter of the workpiece so that when the left end of the feed screw 19 is engaged with the stop member 64 the grinding wheel is located at a shifted position in accordance with the change in radius of the workpiece.

Thus, the rapid feed speed may be changed to the reduced feed speed for rough grinding just before the grinding wheel 15 is brought into contact with the workpiece without regard to the change in diameter of the workpiece.

In addition, it will be seen that when grinding depth of cut is changed, the change thereof has to be programmed and a compensation pulse is applied only to the pulse motor 41 in accordance with a programmed command value.

In this way, the position of the wheel support 12 may be recompensated in accordance with the change in the grinding allowance so as to keep vacant or idle grinding time to a minimum.

The operation necessary to automatically grind workpieces of different diameters and the control means for grinding operation will be described hereinafter.

Initial master setting of the sizing point corresponding to a reference diameter is performed in a manner whereby a reference master gauge having the reference diameter is supported between the centers of the headstock and the tailstock, and thereafter the sizing device is advanced toward the reference master gauge and is positioned at the sizing location. In turn, the manual operation circuit 148 is operated to cause a manual pulse generator (not shown) to apply the required number of pulses to the drive circuit 146, whereby the pulse motor 111 is actuated to regulate the space between feelers 115 and 116 in accordance with the reference diameter, namely, until the sizing signal is generated at the sizing point, or the predetermined voltage level of the displacement detector 133 is attained. As soon as the sizing signal is generated, the aforementioned pulse supply is stopped, whereby to set up the sizing point corresponding to the reference diameter of the reference master gauge. Thereafter, with the clutch member 60 disengaged from the clutch member 50, the wheel slide 12 is advanced by the actuator 20 to the terminal position of rapid feed movement. In the released condition of the clutch, the power feed by actuator 51 is not effective, whereas the drive shaft 45 may be manually rotated by the handwheel 46 through the associated gearing. Thus, the wheel slide 12 is advanced by the handwheel 46 to regulate the rapid feed stroke end thereof relative to the workpiece, so that a vacant space required for diversity in diameter of the workpiece and for grinding allowance may be formed between the peripheral surfaces of the reference master gauge and the grinding wheel 15. In turn, the piston 22 in the actuator 20 is returned to its original position and the clutch elements 50 and 60 are frictionally interengaged by admitting pressure fluid into the clutch cylinder 59.

As to the first command on the program relative to the transverse movement of the wheel slide 12, a differential in the desired finish radius between the reference master gauge and a workpiece to be worked is encoded on the tape, together with plus or minus sign data described hereunder. As to a second command, a differential in the desired finish radius between the first workpiece and a workpiece to be subsequently worked is encoded on the tape together with plus or minus sign data.

As to a third command, similarly, a differential in dimension between the second and a third workpiece is coded on the tape together with plus or minus sign data. Thus, on the tape or record is encoded the machining information which includes the differential in finish dimension between the preceding and the following workpieces to be worked and plus or minus sign data.

In addition, it can be seen that if a calculative function is added to the control device, the desired finish radius of each workpiece can be directly encoded on the tape without the necessity of calculating the differential in dimension between the preceding and the following workpieces.

Moreover, the control circuit 145 is operated to provide an automatic operation in which the tape reader 140 is caused to read the first information which is registered in the preset counter 142. When the gate 144 is opened, one of output lines 170 or 171 is selectively energized in accordance with the direction information (plus or minus) on the tape through the control circuit 145. Assume a case wherein the value of the master gauge is 20 millimeters in diameter and the value of the first workpiece is 30 millimeters, the "word" 5,000 (assuming 1 micron per each pulse) corresponding to the differential 5 millimeters in radius therebetween, is preset in the preset counter 142. Then, the gates 149 and 151 are simultaneously opened in accordance with the plus sign data, since the first workpiece is larger than the master gauge in diameter. Output pulses from the pulse generator 143 are applied to the drive circuits 146 and 147 through the gate 144, the gates 149 and 151, and are simultaneously applied to the preset counter 152 to subtract one pulse from the registered or preset number of pulses each time the preset counter 142 has received one pulse through the gate 144, which is eventually closed to stop pulses from going into the drive circuits when the number registered in the preset counter 142 has become zero. Accordingly, the predetermined number of pulses, corresponding to the registered number is applied to the drive circuits 146 and 147 by means of which the pulse motors 41 and 111 are simultaneously actuated to increase the sizing distance by an amount corresponding to the first information, or 5 millimeters in radius (10 millimeters between the pair of measuring feelers) and to move the wheel slide 12 rearwardly 5 millimeters. Thus, the compensating operations of the sizing point and of the original position of wheel slide 12 are performed at the same time. The hydraulic control circuit 153 is operated to advance the wheel slide 12 toward the workpiece at the rapid speed. Since the amount of 5 millimeters in the position of wheel slide 12 has already been compensated with reference to the terminal end of the rapid feed, as described above, the grinding wheel surface is rapidly moved to the position just before contacting the workpiece regardless of the workpiece diameter, and in turn is advanced to the first workpiece at a reduced speed for rough grinding. As the rough grinding operation progresses, the workpiece to be worked on is reduced in diameter to a value slightly greater than the finish dimension and the voltage from the detector approaches the operation point, or the predetermined voltage level. When the grinding operation has progressed to a point where only the finish depth of cut is left on the workpiece, the first sizing signal is generated by the action of Schmidt circuit 167 which receives the voltage from the detector 133 and causes the hydraulic control circuit 153 to close the changeover valve 158 to change from the first reduced speed for rough grinding to the further reduced speed for fine grinding. Further progress in the grinding operation eventually results in the generation of the second sizing signal, by which the valve 159 is shut, as shown in FIG. 7, to stop the feed movement of the wheel slide 12, which is then moved rearwardly at rapid speed after spark-out for a predetermined time defined by a timer (see FIG. 8). The wheel slide 12 is returned to the starting position.

Similarly, a second command is read by the tape reader 140 as to the finish radius of a workpiece to be second-worked, to automatically compensate the sizing points and the original position in accordance with the second command, and thereafter the wheel slide 12 is moved toward the second workpiece by the hydraulic feed actuators. The feed movement of the wheel slide is controlled by the sizing signals of the sizing device 81, as well as by the first operation.

In addition to the aforementioned operation, the grinding wheel 15 is dressed at an adequate time and the position of the wheel slide 12 is compensated by the grinding wheel compensating apparatus 65 consisting of the conventional ratchet feed mechanism 66, the gearing and the hydraulic actuator 67, so as to maintain the grinding surface in a constant position relative to the workpiece, since the displacement amount of the wheel slide 12 is equalized in accordance with the dressing amount. The compensating operation is performed in a well-known manner such that the hydraulic actuator 67 is operated in relation to the dressing operation so as to rotate drive shaft 45 and the feed shaft 19 through the action of the associated gearing and the engagement between a pawl and a ratchet under conditions of disengagement of the clutch members 50 and 60.

In the aforementioned compensating operation, it can be seen that compensating apparatus 65 may be omitted if an apparatus is added which applies a predetermined number of compensation pulses to the pulse motor 41 in accordance with a directing signal.

Thus, since the feed movement of wheel slide 12 is controlled by sizing device 81, errors produced by thermal deformations of the grinding machine and the workpiece and by grinding wheel wear and the like, are almost excluded.

Moreover, it is possible to continuously measure either the diameters of different workpieces or the specified diameters of a multidiameter workpiece.

In the present invention, since the compensating operations, which shift the generation point of sizing device 81 and regulate the original position of wheel slide 12 relative to the workpiece, are simultaneously performed by a common programmed command, it is easy to program the machining operation and to prevent making a mistake in the programming. Furthermore, the compensating operation corresponding to numerical information is performed at a time before starting of the grinding operation. Thereafter, the predetermined infeed movement is performed by the hydraulic actuators without regard to the numerical control device and is controlled by the sizing device in response to the diameter of the workpiece to be worked on. Therefore, according to the present invention, a simplified and inexpensive control device can be used as a numerical control system.

Figure 7:
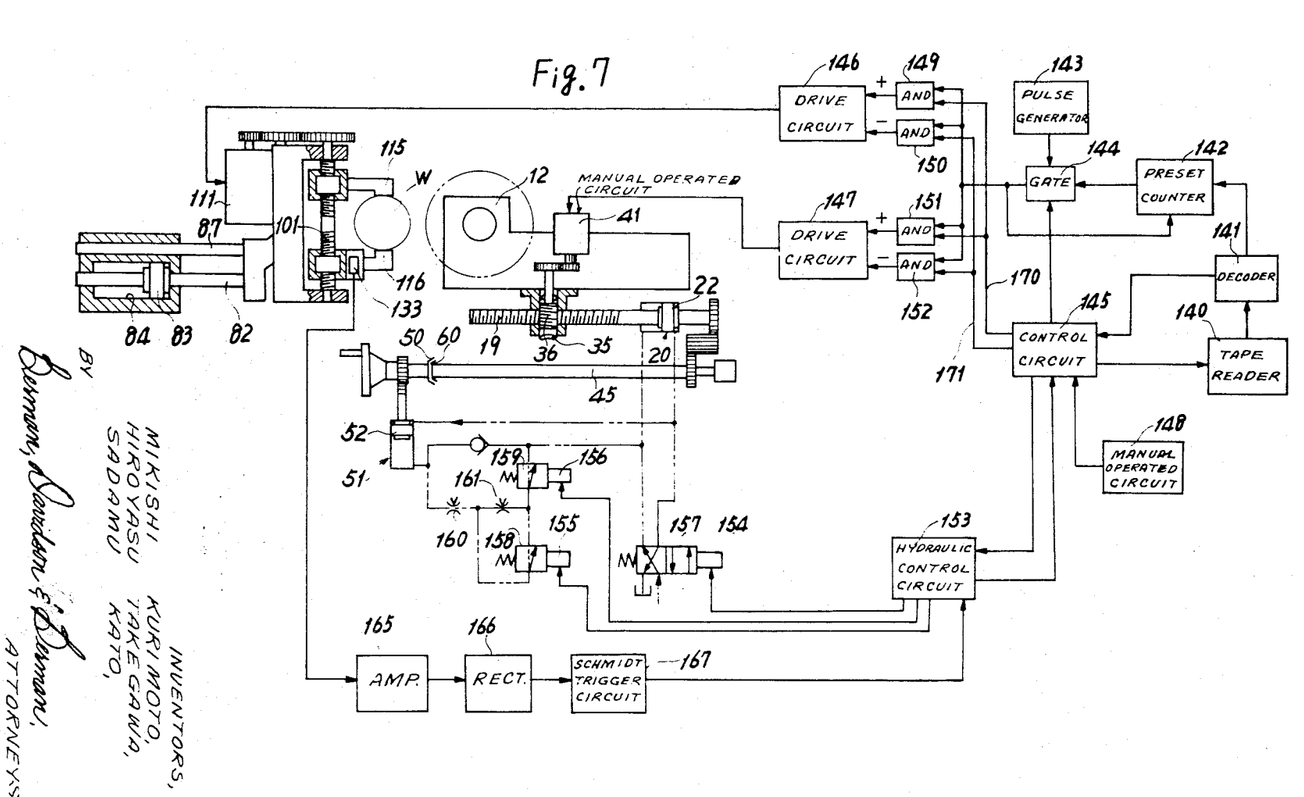
FIG. 7 is a block diagram showing the control system of the sizing device and the feed mechanism for the wheel slide.

The various parts shown in the blocks in FIG. 7 are conventional, and may be as follows:

Pulse motor 111: Model No. EPM-109
Pulse motor 41: Model No. EHPM-½-SSSS
140–152 inclusive: Modules contained in "FANUC" System, Model No. FANUC 260.

The above items are manufactured by Fujitsu Ltd., Tokyo, Japan.

Schmidt circuit 167: Contained in Delta Model E-MD-P35 C-2P manufactured by Tokyo Seimitsu Ltd., Tokyo, Japan.

What is claimed is:

1. A grinding machine comprising a bed, a wheel slide slidably mounted on said bed, a grinding wheel rotatably supported on said wheel slide, a table mounted on said bed operably to support a workpiece, a feed screw movably mounted on said bed and threadedly engaging with said wheel slide to move same, feed means drivingly engaging with said feed screw, compensating means having a first servomotor operatively mounted for compensating an original position of said wheel slide relative to said workpiece in accordance with a command, sizing means providing a sizing signal to control said feed means responsive to the diameter of said workpiece during a grinding operation, said sizing signal being generated at a predetermined sizing point, means including a second servomotor to shift said sizing point in accordance with said command before said grinding operation, and control means simultaneously providing said command to said first and second servomotors to cause same to operate in accordance with numerical information associated with a desired finish diameter of said workpiece.

2. A grinding machine as claimed in claim 1 in which said compensating means comprises a nut member rotatably mounted on said wheel slide and engaging with said feed screw, a worm wheel coaxially secured to said nut member, and a worm drivingly engaging with said worm wheel and rotated by said first servomotor on said wheel slide, and means whereby said nut member is rotated by said first servomotor to compensate said original position of said wheel slide by an amount equal to one-half of the differential in a desired finish diameter between said workpiece and a workpiece previously worked and is restrained against rotation when said first servomotor is inoperative.

3. A grinding machine as claimed in claim 1 in which the sizing means comprises a sizing head mounting two vertical guide bars fixedly secured thereto at their upper and lower ends, a threaded rod rotatably mounted on said sizing head in parallel relation to said guide bars and drivingly engaged with said second servomotor, a pair of feelers slidably mounted on said guide bars and drivingly engaging with said threaded rod, said pair of feelers being maintained in contact with said workpiece at positions on said workpiece diametrically opposed to each other during said grinding operation, and means whereby the space between said two feelers is shifted by an amount equal to the differential in a desired finish diameter between said workpiece and a workpiece previously worked before said grinding operation.

4. A grinding machine as claimed in claim 1 in which said control means comprises drive circuit means connected to both of said first and second servomotors to drive the same, a gate connected to said drive circuit for permitting a predetermined number of pulses corresponding to said numerical information to pass therethrough, and a pulse generator for providing a train of pulses to said drive circuit means to said gate, whereby said first and second servomotors may be controlled simultaneously by said numerical information.

5. A grinding machine as claimed in claim 4 in which said drive circuit means comprises a first drive circuit connected to said first servomotor, a first pair of AND gates connected to said first drive circuit and said first-named gate for controlling flow of said pulses from said first-named gate to said first drive circuit to select a rotational direction of said first servomotor in accordance with said numerical information, a second drive circuit connected to said second servomotor, and a second pair of AND gates connected to said second servomotor and said first-named gate for controlling flow of said pulses from said first-named gate to said second drive circuit to select a rotational direction of said second servomotor, whereby said first and second servomotors may be simultaneously rotated in the same direction.

6. A grinding machine comprising a bed, a wheel slide slidably mounted on said bed, a grinding wheel rotatably supported on said wheel slide, a table mounted on said bed operably to support a workpiece, a feed screw movably mounted on said bed and threadedly engaging with said wheel slide to move same, feed means drivingly engaging with said feed screw, a first pulse motor mounted on said wheel slide, a worm secured to the output shaft of said first pulse motor, a nut member rotatably mounted on said wheel slide and engaging with said feed screw, a worm wheel coaxially secured to said nut member and engaging with said worm, a sizing head mounting two vertical guide bars fixedly secured thereto at their upper and lower ends, a second pulse motor mounted on said sizing head, a threaded rod rotatably mounted on said sizing head in parallel relation to said guide bars and drivingly engaged with said second pulse motor, a pair of feelers slidably mounted on said guide bars and drivingly engaged with said threaded rod, said pair of feelers being maintained in contact with said workpiece at positions on said workpiece diametrically opposed to each other during a grinding operation, a detector mounted on one of said feelers for providing a sizing signal to control said feed means during said grinding operation, a first drive circuit connected to said first pulse motor to drive the same, a first pair of AND gates connected to said first drive circuit for controlling flow of pulses into said first drive circuit to select a rotational direction of said first pulse motor in accordance with numerical information, a second drive circuit connected to said second pulse motor to drive the same, a second pair of AND gates connected to said second drive circuit for controlling flow of pulses into said second drive circuit to select a rotational direction of said second pulse motor in accordance with said numerical information, a gate connected to said first and second pair of AND gates and permitting a predetermined number of pulses corresponding to numerical information to pass therethrough, said numerical information corresponding to the differential in a desired finish diameter between said workpiece and a workpiece previously worked, and pulse generator means providing a train of pulses to said first and second pair of AND gates through said last-named gate, whereby said first and second pulse motors may be simultaneously rotated in accordance with said numerical information.

* * * * *